(12) United States Patent
Davis

(10) Patent No.: US 9,927,578 B2
(45) Date of Patent: Mar. 27, 2018

(54) FIBER OPTIC ROTARY CONNECTOR

(75) Inventor: Edward Davis, Kihei, HI (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 13/200,031

(22) Filed: Sep. 14, 2011

(65) Prior Publication Data

US 2012/0134622 A1 May 31, 2012

Related U.S. Application Data

(60) Provisional application No. 61/403,403, filed on Sep. 14, 2010.

(51) Int. Cl.
*G02B 6/26* (2006.01)
*G02B 6/36* (2006.01)
*G02B 6/32* (2006.01)

(52) U.S. Cl.
CPC .............. *G02B 6/3604* (2013.01); *G02B 6/32* (2013.01); *G02B 6/3664* (2013.01)

(58) Field of Classification Search
CPC ....... G02B 6/3604; G02B 6/3664; G02B 6/32
USPC .................... 385/24, 26; 359/861; 250/234
See application file for complete search history.

(56) References Cited

U.S. PATENT DOCUMENTS

| 4,725,116 | A  | * | 2/1988  | Spencer et al. ............... 385/26 |
| 5,296,972 | A  | * | 3/1994  | McKinley ..................... 359/861 |
| 5,365,288 | A  | * | 11/1994 | Dewald et al. ................ 353/98 |
| 6,271,514 | B1 | * | 8/2001  | Thomas et al. .............. 250/234 |
| 7,177,497 | B2 | * | 2/2007  | Barrett ........................... 385/24 |
| 7,548,575 | B1 | * | 6/2009  | Jackson et al. .............. 372/108 |
| 7,842,901 | B2 | * | 11/2010 | Wawers et al. .......... 219/121.67 |
| 2010/0195956 | A1 | * | 8/2010  | Zhang et al. ................... 385/26 |

* cited by examiner

*Primary Examiner* — Ellen Kim
(74) *Attorney, Agent, or Firm* — John R. Ross

(57) ABSTRACT

A fiber optic rotary connector providing communication between a first fiber optical bundle and a second fiber optical bundle rotating relative to said first bundle. The fiber optic rotary connector includes a K-mirror comprised of at least three mirror components and a set of gears adapted to rotate said K-mirror at a rotation rate equal to one half of the second bundle rotation rate. In a preferred embodiment the set of gears is a set of magnetic gears. And in another preferred embodiment the set of gears is a set of mechanical gears. Normally the first fiber optic bundle is stationary, but it may be rotating at a slower rate than the second bundle. In preferred embodiments the K mirror is comprised of three flat mirrors and two of the flat mirrors are positioned at about 30 degrees relative to the third flat mirror.

6 Claims, 8 Drawing Sheets

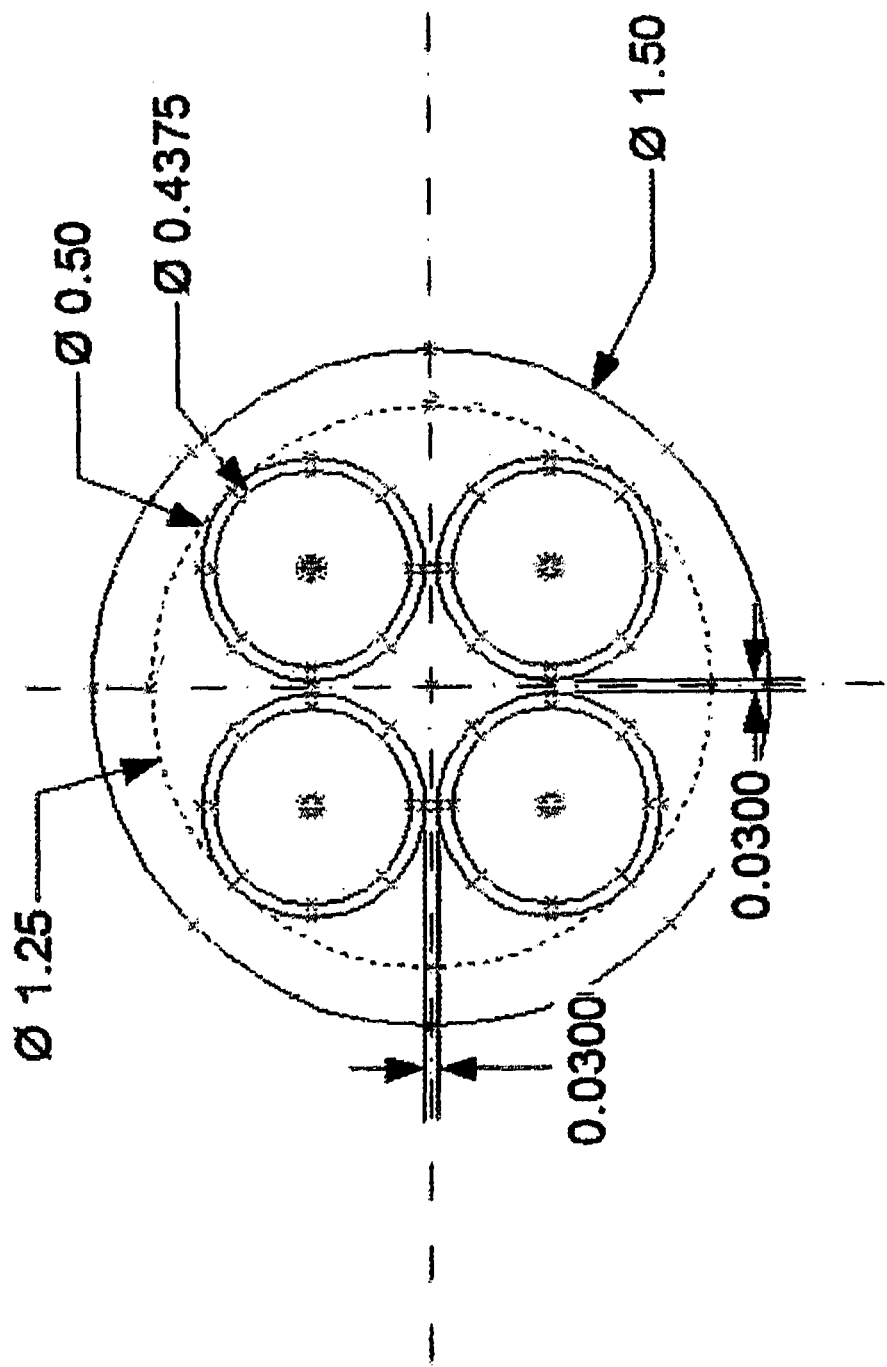

FIBER OPTIC ROTARY CONNECTOR

CROSS REFERENCE TO PRIOR APPLICATIONS

The present invention claims the benefit of Provisional Patent Application Ser. No. 61/403,403 filed Sep. 14, 2010.

FEDERALLY SPONSORED RESEARCH

The present invention was made in the course of work under Contract No. N68335-09-C-0095 and Contract N68335-11-C-0204 both with the United States Navy and the United States Government has rights in the invention.

FIELD OF THE INVENTION

The present invention relates to optical connectors and in particular to fiber optic rotary connectors.

BACKGROUND OF THE INVENTION

Fiber Optic Rotary Joints allow optical signals carried by fiber optic cables to traverse a rotating interface (for example between the rotating and stationary parts of a piece of equipment). Fiber optics are used in many different applications, and are rapidly replacing traditional copper wiring for communications of signals. Solutions such as slip-rings exist to allow traditional electrical signals to traverse a rotating interface with low loss, but currently existing Fiber Optic Rotary Joints tend to have much higher losses than their electrical counterparts (in addition, existing Fiber Optic Rotary Joints tend to be more complex as well, containing many moving parts such as gear trains and de-rotation prisms—potentially impacting their usable life & reliability).

Applications are numerous, and include rotating radars antennas, photonic control of phased array antennas, instrumentation of rotating equipment (even turbo machinery), data transmission on aircraft, and many other systems. These types of equipment and sensors are used in both the commercial and defense arenas.

Traditional fiber optic rotary joints have usually been built with a de-rotation prism that aims the laser beam from the rotating side of the rotational interface at a consistent stationary point on the stationary side of said interface (see Ames 1992, 1994, etc and Iverson 1978). This de-rotation prism (typically a Dove or Pechan prism) must rotate at ½ the rotational rate of the rotating half of the joint or alternatively can be thought of as rotating at an average of the speed of the two halves (in relative rotation sense). Because of this half speed rotation, these fiber optic rotary joints typically require a reducing gear train and a number of associated bearings, introducing additional sources of misalignment, wear, and failure modes. This patent proposes to utilize magnetic gears (which have been known for over a century—see Armstrong, 1901, Faus 1940), and potentially magnetic bearings as well to essentially suspend these de-rotation optics in mid air, and avoid these concerns— Magnets have actually been used in fiber optic rotary joints that do not include de-rotation optics (such as Spencer & Oliver, 1988), but to the best of our knowledge, magnetic gears and bearings have never been employed with de-rotation optics, which will allow many more channels to pass through the rotary joint simultaneously.

Magnetic gears have been known for many years. Early examples are Faus, U.S. Pat. No. 2,243,555; Iverson, U.S. Pat. No. 4,109,998; and Spencer & Waverly U.S. Pat. No. 4,725,116.

What is needed is a better fiber optic rotary joint.

SUMMARY OF THE INVENTION

Applicant has invented a novel approach to Fiber Optic Rotary Joints that relies on special collimation technology, and a K-Mirror de-rotation mechanism. This new Fiber Optic Rotary Joint has the potential to exhibit higher channel counts, lower loss, and higher reliability than competing technologies. In addition, it is bi-directional, wavelength independent, and can likely operate at higher rotational speeds than competing approaches.

The fiber optic rotary connector of the present invention provides communication between a first fiber optical bundle and a second fiber optical bundle rotating relative to said first bundle. The fiber optic rotary connector includes a K-mirror comprised of at least three mirror components and a set of gears adapted to rotate said K-mirror at a rotation rate equal to one half of the second bundle rotation rate. In a preferred embodiment the set of gears is a set of magnetic gears. And in another preferred embodiment the set of gears is a set of mechanical gears. Normally the first fiber optic bundle is stationary, but it may be rotating at a slower rate than the second bundle. In preferred embodiments the K mirror is comprised of three flat mirrors and two of the flat mirrors are positioned at about 30 degrees relative to the third flat mirror.

Applications are numerous, and include photonic control of rotating phased array antennas, instrumentation of rotating equipment (including turbo machinery), data transmission on aircraft, and many other systems. These types of equipment and sensors are used in both the commercial and defense arenas. In particular, for this topic, there is a strong interest in true time delay lines for photonic control of phased array antennas. One particularly nice benefit of this technology is the potential for large weight savings enabled by replacing heavy copper coaxial cables with lightweight fiber optic lines. Some of the particular motivations for this work include:

Moving to more fiber based devices & sensors
Better Noise Floor than electrical cabling
Immunity to Electromagnetic Interference, Eavesdropping, & Jamming
Much Lower Weight than Large Numbers of Coaxial Cables
Dramatically Increased bandwidth as compared to electrical cabling
True Time Delay to Avoid Wavelength Dependent Angular Change & Squint
Desire for lower loss, higher reliability, & more rugged solutions than existing FORJ's

BRIEF DESCRIPTION OF THE DRAWINGS

FIG. 8 shows a square pattern of four collimation lenses.

DETAILED DESCRIPTION OF PREFERRED EMBODIMENTS

Figure 1:
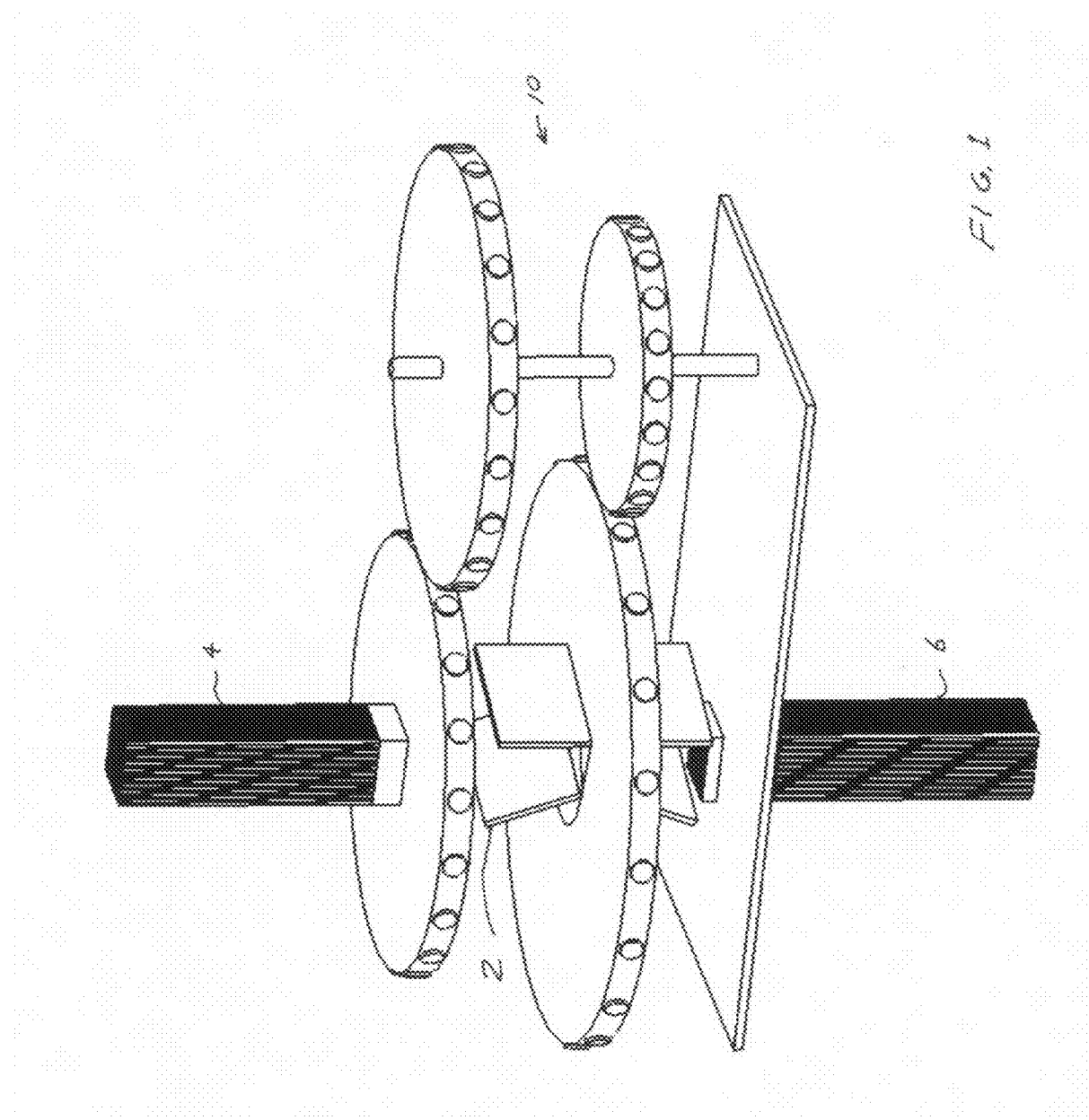
FIG. 1 is a first prospective view showing features of a preferred embodiment of the present invention.
Figure 2:
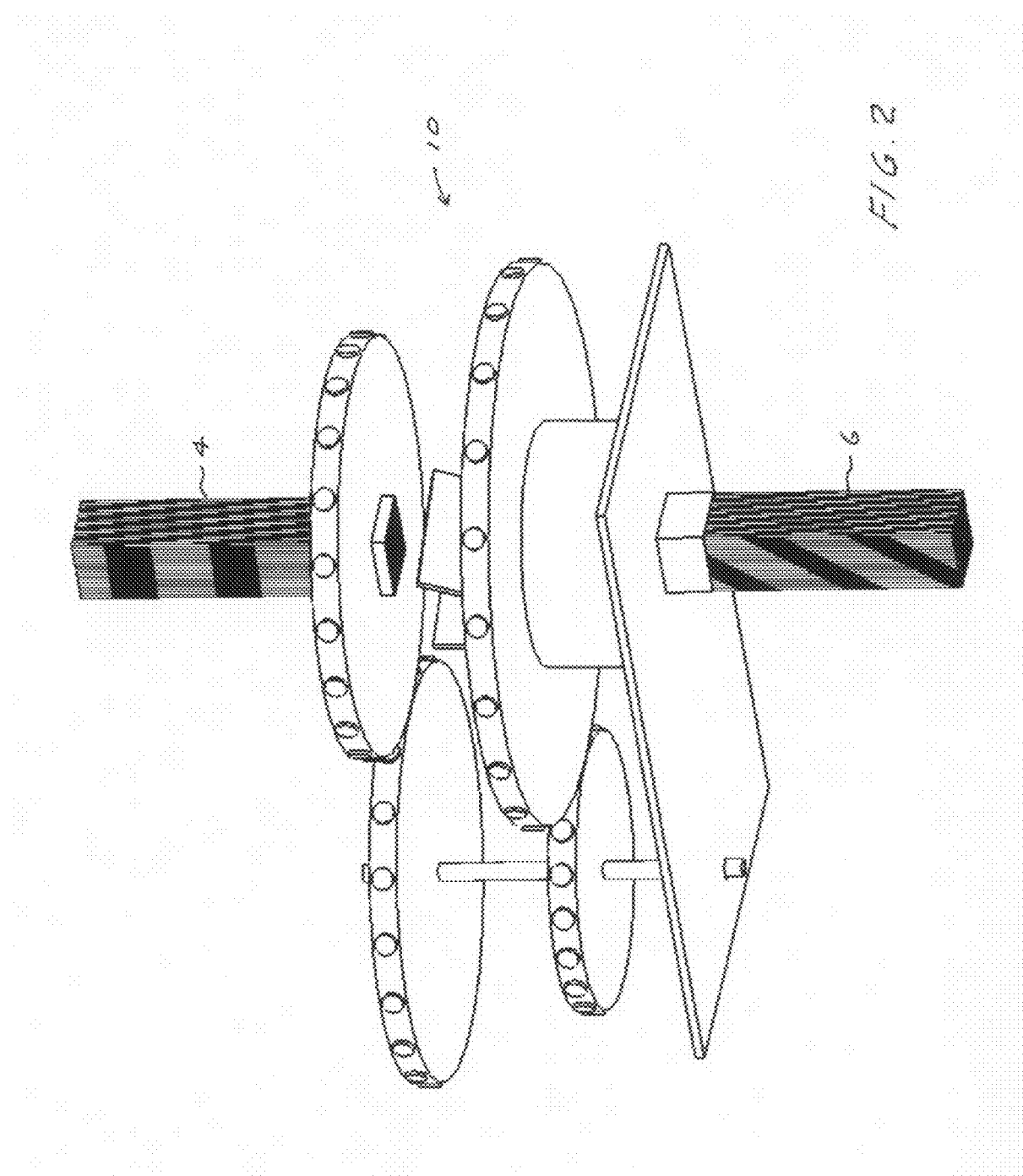
FIG. 2 is a second prospective view showing features of a preferred embodiment of the present invention.
Figure 3:
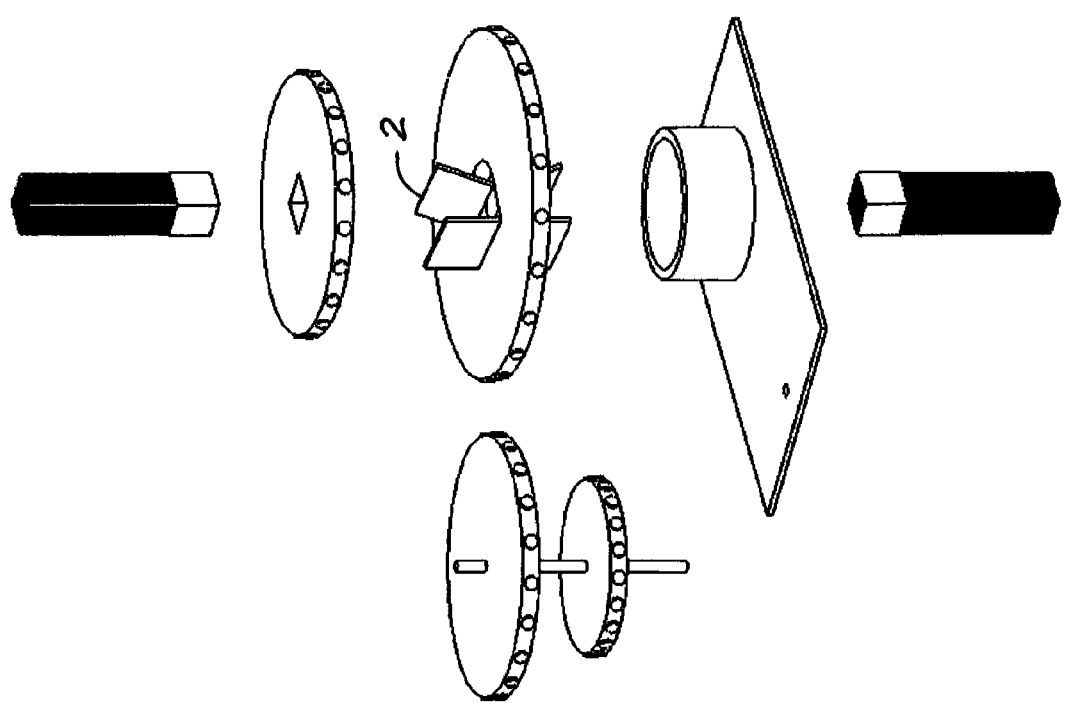
FIG. 3 is an exploded view showing features of a preferred embodiment of the present invention.

Applicant's fiber optic rotary joint concept is depicted in FIGS. 1, 2 and 3. The figures respectively show an upper view, a bottom view and an exploded view. Shown on the drawings are rotating fiber bundle 4, a K mirror 6 rotating at half speed and a fixed bundle 8. A set 10 of four magnetic gears set the half speed of the k mirror. This new K-Mirror concept utilizes mirrors rather than Pechan or Dove prisms, so that many wavelengths can be passed through the same Fiber Optic Rotary joint, and relies on magnetic gears to avoid the complexity and potential hit to reliability inherent in most traditional de-rotation base rotary joints. By rotating the K-Mirror portion 2 of this rotary joint at half the speed of rotation (or more generally speaking the average between the speed of the two halves), the alignment between input and output beams is maintained regardless of position. This half speed rotation is accomplished by non-contact magnetic gears, avoiding friction, wear, backlash, lubricants, and potential failures possible with traditional de-rotation based designs.

Some of the potential advantages of this approach include:

The Ability to Accommodate Many Simultaneous Channels (up to about 128 with Trex's CrossFiber collimator arrays)—Potentially more in the future Extremely Low Friction/Wear—High Reliability Wavelength Independence—K-Mirrors allow wavelength independent de-rotation (as opposed to Dove Prism or Pechan Prism)

High Reliability

Could Potentially Employ Magnetic Bearings in the future as well

Testing the Design

In a prototype design, the rotary joint is vertically clamped to a rigid tower. A drive motor attached to the tower is used to directly drive the rotation of the rotary joint. This external motor may be coupled through the idler magnetic gear shaft. A stepper or servo motor with an encoder for feedback will likely be used. This will enable precise positioning of the rotary joint angle for detailed examination of rotationally dependent losses.

There are two complementary approaches that may be used for configuring the rotary joint for testing. Both eliminate the need for externally coupling to the fibers on the rotating side of the rotary joint, greatly simplifying the overall test bed design.

Loopback Configuration

In the loopback configuration, input signals are coupled into half of the available channels on the static side of the rotary joint. On the rotating side, the input channels are looped back into the unused set of channels, making sure that none of the signals are looped back into an adjacent channel. After looping back, the input signals pass though the rotary joint as second time and are passed out though the stationary side of the rotary joint to the external test equipment.

In this configuration, the measured insertion loss is the cumulative sum of the losses of both the forward and return paths. The single channel performance can be extracted by performing three sets of measurements. For three given rotary joint channels, A, B, and C, the forward+return configurations are A+B, A+C, and B+C. The single channel performance can be extracted by adding any two measurements and subtracting the third. For example, $$(A+B)+(A+C)-(B+C)=2A$$

Retro-Reflector Configuration

In the retro-reflector configuration, each rotary joint channel on the rotating side is coupled to a fiber retro-reflector. Input signals pass twice through the same channel and are returned on same input fiber. An optical circulator installed on the input fiber is used to couple the signal from a laser source into the fiber and the return signal into a calibrated photo-detector. This configuration has the advantage of enabling testing of all rotary joint input channels either sequentially or in parallel without having to open the environmental chamber. It also has the advantage of mixing multiple channels in a single measurement. The main disadvantage is that back reflection is not distinguished from signal returned from the retro-reflector, so high Optical Return Loss (ORL) could artificially improve insertion loss measurement results. However, this can be mitigated by performing separate ORL measurements.

Optical Return Loss Configuration

For Optical Return Loss measurements, the rotary joint output connectors on the rotating side will be terminated to prevent back reflection. This will enable direct ORL measurements using a Back Reflection Meter.

Test Equipment

All test equipment is remotely located external to the environmental chamber. The optical input signal will be provided by a fiber coupled laser. Lasers at 850 nm, 1310 nm, and 1550 nm are included in the conceptual design to enable testing at each wavelength. The output signal will be detected using a calibrated 1R photo-detector. Typical photo-detectors that are sensitive over the range of interest (such as Germanium or InGaAs detectors) have significant dark current. This would need to be subtracted for DC signal measurements. An alternative approach that we will explore is to modulate the amplitude of the optical input signal (up to 100 kHz modulation frequency) and then read out the detected signal using a lock-in amplifier referenced to the same frequency. This approach enables rejection of signals at other frequencies, including DC. Thus any offset due to dark current and/or stray light is rejected from the measurement. The use of a lock-in amplifier also greatly improves the signal to noise ratio of the measurement, which is beneficial for small signal measurements such as crosstalk.

Applicant analyzed, designed, and built a prototype four-channel multimode fiber optic rotary joint. This rotary joint approach converts the signal from each input fiber optic channel to a collimated free-space beam. The beam is de-rotated using a k-mirror, and then coupled back into fibers on the other side of the rotary joint. The optical and mechanical design requires attention to several key areas. These include:

Fiber selection

Lens selection

Free space optical path length
Magnetic gear design

Fiber and Lens Design Considerations

The selection of the multimode fiber for use in the prototype required consideration of the fiber diameter, and numerical aperture. Both of these parameters are subject to multiple constraints imposed by the overall system design.

Figure 4:
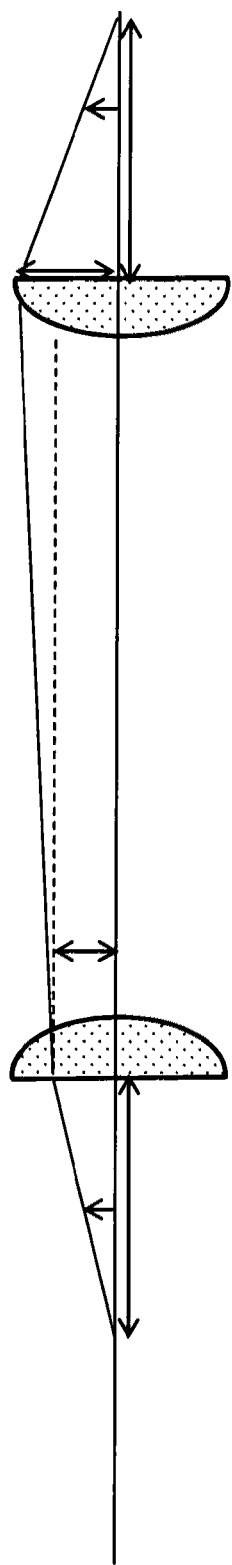
FIG. 4 shows a lens design for coupling a fiber output from a first optical fiber to a second optical fiber.

Ordinarily to maximize the coupling of light into the fiber, the fiber diameter should be as large as possible. There is however a second constraint on the fiber diameter. The output of the bare fiber end is to be collimated by placing a lens one focal length away. If the fiber end was an ideal point source, the beam could be perfectly collimated. However, since the fiber diameter is finite in size, the collimated beam will have a divergence angle that is proportional to the fiber diameter. FIG. 4 depicts the collimation of the fiber output and subsequent coupling of the collimated beam into a second fiber using a two-lens system.

In FIG. 4 the output fiber (left side) has a radius of r1 and its output half-angle is θ1. The output half angle is a characteristic of the fiber and is typically specified as the numerical aperture (NA), which is equal to sin θ1 in air. The divergence angle of the collimated beam is determined by the ratio of the focal length of the collimating lens and the radius of the fiber.

$$\theta_D = \frac{r_1}{f_1}$$

Therefore, the divergence decreases with decreasing fiber radius and increasing lens focal length.

Figure 5:
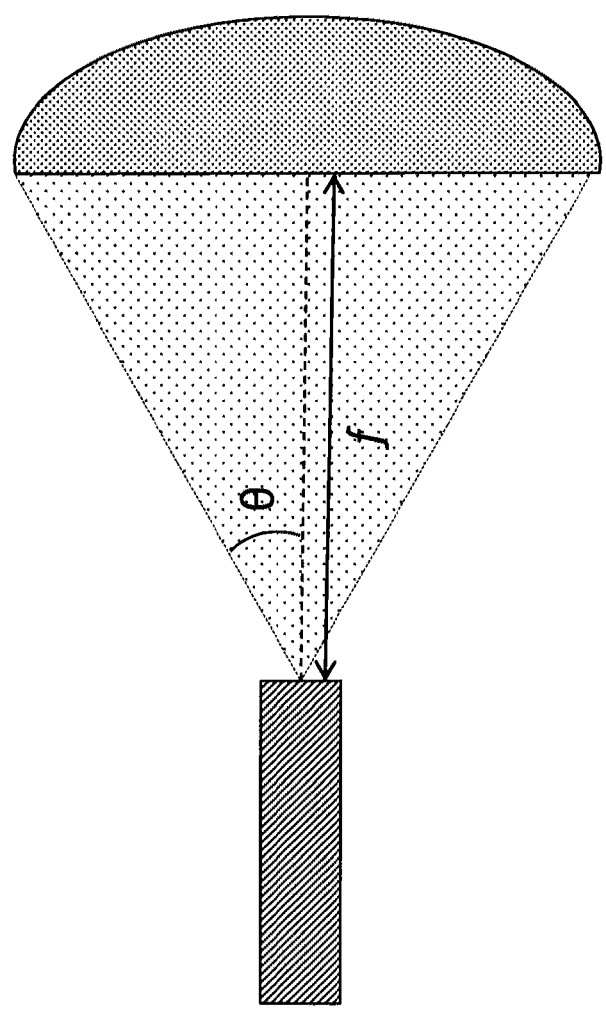
FIG. 5 shows a technique for optimizing coupling of light into a collimated beam.

In order to maximize the coupling of light into the collimated beam, the numerical aperture of the lens must be at least as large as the NA of the fiber as shown in FIG. 5

The lens NA is also equal to sinθ. This fixes the ratio of the lens focal length to its diameter.

$$NA = \sin\theta = \sin\left(\tan^{-1}\frac{\frac{D}{2}}{f}\right)$$

The f-number, N of the lens is defined as f/D. Therefore, using the small angle approximation, the relation reduces to:

$$N \approx \frac{1}{2 \cdot NA}$$

Optimizing the coupling of the collimated beam into the output fiber requires that the collecting lens have a numerical aperture at most the same as that of the output fiber. If the same fiber is used for input and output, then the optimal configuration is to use symmetric lenses with clear apertures equal to the fiber clear aperture.

The fiber-lens interactions discussed thus far impose constraints on the fiber and lens selection based on the acceptable collimated beam divergence. To determine what convergence is acceptable, the free space optical path length of the system must be known. For this initial prototype, it is reasonable to limit the expansion of the beam diameter to approximately 1.5× the initial diameter. Assuming a Gaussian intensity profile, approximately 2σ (or 95%) would be collected using a symmetric lens to couple the light into the output fiber (assuming the beam is visible to approximately 3σ (99.7%)).

K-Mirror Design Considerations

Figure 6:
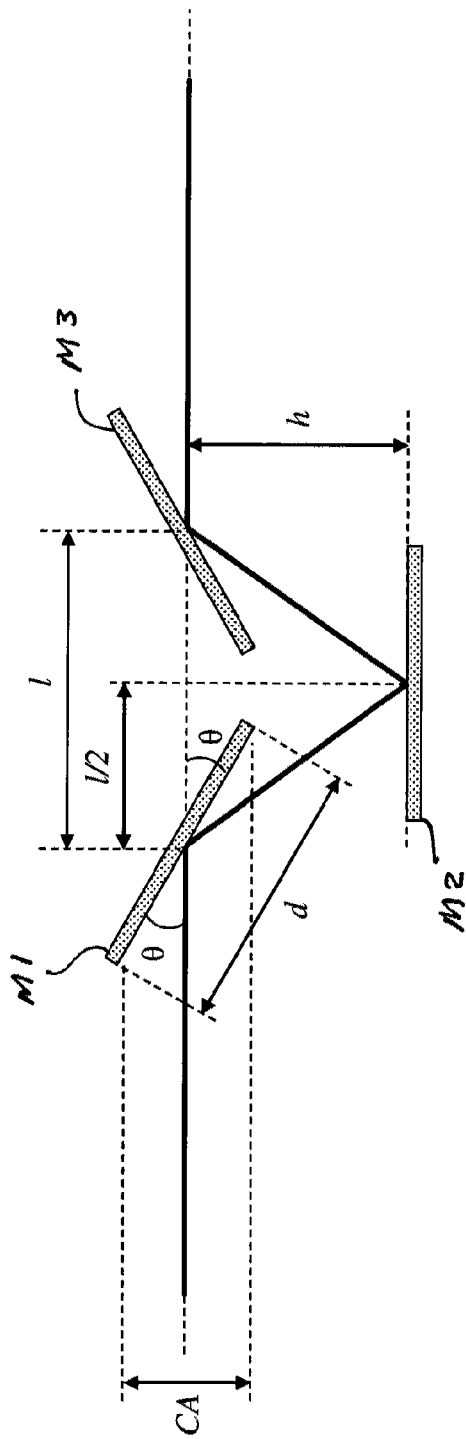
FIG. 6 illustrates important features of the present invention.
Figure 7:
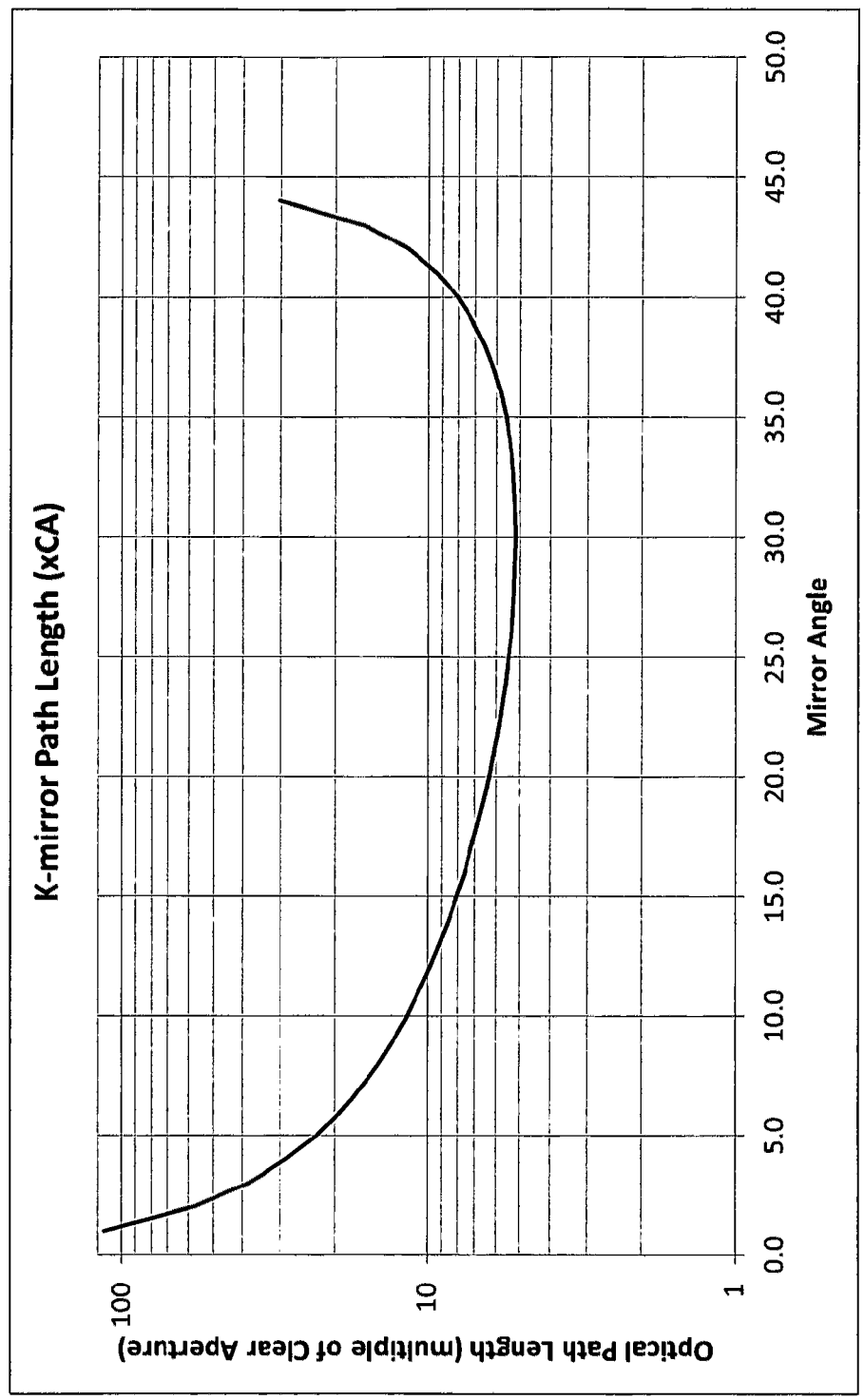
FIG. 7 illustrates a relationship between optical path length and K-mirror angle.

The optical path length of the prototype is determined primarily by the path length through the k-mirror. FIG. 6 shows the optical path though a k-mirror. The mirrors will be denoted as M1, M2, and M3 from left to right along the optical path. As can be seen in the figure, the angles of mirrors M1 and M3 determine the placement of mirror M2. At shallow angles to the incident beam, the distance to mirror M2 is very small. However, the clear aperture (CA) of the k-mirror becomes very small as well. In order to maintain a minimum CA, the length, d, of the mirrors must be increased. Conversely at steep angles, mirror M2 must be placed far away to return the beam to the original optical axis when reflected back to M3. Note that the angles of mirrors M1 and M3 must be symmetric and are limited to the range between 0° and 45° (at 0° the mirror is parallel to the incident beam and at 45° the beam is reflected at a 90° angle).

The CA is typically fixed by the rest of the system, therefore optical path length through the k-mirror as a function of mirror angle (M1 and M3) can be determined for a given fixed CA. The relation between h and θ can be determined geometrically and is given by:

$$\tan(2\theta) = \frac{h}{\frac{l}{2}} \rightarrow h = \frac{l}{2}\tan(2\theta)$$

The clear aperture is also related to the mirror angle by:

$$CA = d \sin\theta$$

From entry into the k-mirror, the optical path length can then be calculated $$\text{Path Length} = 2\left(\frac{d}{2}\cos\theta + \frac{h}{\sin(2\theta)}\right)$$

Since the clear aperture is related to the mirror angle, the path length can be recast in terms of the CA $$\text{Path Length} = 2\left[\frac{d \cdot \sin\theta}{2 \cdot \tan\theta} + \frac{\frac{l}{2}\cdot \tan(2\theta)}{\frac{\tan(2\theta)}{\cos(2\theta)}}\right]$$

Assuming no space between mirrors M1 and M3 (i.e. l=d cos θ). In terms of CA, this yields:

$$\frac{l}{2} = \frac{CA}{2\tan\theta}$$

Substituting in the relations for CA, the path length is now $$\text{Path Length} = 2\left[\frac{CA}{2\cdot\tan\theta} + \frac{CA\cdot\cos(2\theta)}{2\cdot\tan\theta}\right] = \left(\frac{1+\cos(2\theta)}{\tan\theta}\right)\cdot CA$$

The path length through the k-mirror as a function of mirror angle is shown in FIG. 8.

The minimum in path length of 5.196 CA is found to occur at a mirror angle of 30°.

Prototype Design

In the current prototype design, the multimode fiber was chosen to have a diameter of 0.25 mm and a numerical aperture of 0.5. This dictated that the lens also have a numerical aperture of 0.5 (f/#=1.0). A 0.5 inch (12.7 mm) diameter plastic aspheric lens with a 0.5 inch focal length was selected. The prototype was designed for four-channel operation. With four collimation lenses placed in a square pattern with 0.030 inch separation, the system clear aperture was set at 1.25 inches as shown in FIG. 8.

The k-mirror was designed to minimize the free space optical path length. The angles mirrors M1 and M3 were set at 30°. For a CA of 1.25 inches, this yields a path length of 6.5 inches within the k-mirror. For the k-mirror assembly 31×77 mm, wave front surface mirrors were selected to closely match the clear aperture of the rest of the system.

The collimated beam divergence angle calculated for the selected components is 0.564°. At a path length of 6.5 inches, the beam diameter will have expanded to 0.628 inches from an initial diameter of 0.5 inches.

The relative rotational position of the upper collimator and the k-mirror are maintained at a 2:1 ratio by use of magnetic gears as shown in FIGS. 1, 2 and 3. The upper magnetic gear set attached to the upper collimator has 18 poles and a gearing ratio of 1:1. The lower set of magnetic gears has a gearing ratio of 2:1 with 24 poles on the gear attached to the k-mirror and 12 poles on the external gear. The upper and lower external gears are mounted to the same shaft, which maintains the relative position of the two sets. It should be noted that the use of magnetic gears has significant advantages over traditional gears in this application. Primarily, there is no backlash, and the contactless design requires no lubrication in the vicinity of the optics.

Description of System Alignment Procedure

System alignment was critical and consisted of aligning all rotational axes and the k-mirror optical output to a primary optical reference axis. This process is aided by use of a long lever arm at the output. In this experiment, a lever arm of approximately 2 meters was used. This was accomplished by placing a turning flat at the bottom of the de-rotation assembly to redirect the output beam parallel to the optical table. Two additional fold mirrors were used to position the end of the lever arm at an IR target within easy view from the rotary joint.

After removal of the k-mirror subassembly (leaving the rotating X-Y and kinematic mounts in place), the reference axis was defined by adjusting the X-Y and tip/tilt of the fiber launch rotating subassembly to eliminate precession of the output beam. The fiber launch global tip/tilt was also adjusted to make the beam vertical. The IR target position was then adjusted to center reference marker on the beam. This point was then used to define the output reference for the rest of the alignment procedure.

Once the reference axis was defined, an IR target was placed on the k-mirror kinematic mount the rotating X-Y position of the k-mirror mount was adjusted to eliminate visible precession. The global X-Y was then adjusted to center the rotational axis on the reference beam. The k-mirror was then reinstalled and the IR target was placed at the top of the k-mirror cage. The rotating assembly tip/tilt and global tip/tilt were used to respectively eliminate precession and center the rotational axis at the top of the k-mirror. At this point the de-rotation assembly was coarsely aligned to the reference axis.

The k-mirror, consisting of 3 flat mirrors (M1, M2, and M3 in the order from top to bottom) was coarsely aligned next. The vertical angle of M1 and M3 were set to approximately +30° and −30° to the reference axis, respectively. The exact angle is not critical as long as it is large enough to provide a reasonable clear aperture and small enough to strike near the center of M2 in a reasonable distance. The IR target was placed at M2 and the position of M2 was then adjusted so that the beam reflected by M1 struck near its center. The horizontal angle of M1 was adjusted to center the spot horizontally on M2 as well. The IR target was then placed at the bottom of the rotating k-mirror assembly and the tip/tilt of M2 was adjusted to center the beam on the rotational axis. Lastly, the tip/tilt of M3 was adjusted to minimize the precession at the far target.

Fine alignment of the system was then performed as an iterative process. The global tip/tilt of the de-rotation assembly was adjusted to center the precession of the beam at the far target. An IR target was then placed at the top of the k-mirror and the de-rotation assembly tip/tilt was adjusted to re-center the beam on the rotation axis. The k-mirror alignment described in the preceding paragraph was then repeated. This process was iterated several times until the precession at the far target was minimized and checks of the rotational axis at the top and bottom of the k-mirror confirmed alignment to the reference beam. Further improvements to alignment could be realized by use of a longer lever arm and more iterations of this process.

The k-mirror has significant alignment flexibility. The positions and angles of the 3 mirrors can span a significant range. The only absolute requirement is that the mirrors be adjusted to bring the output back on to the axis of the input beam. A secondary effect of asymmetric angles in M1 and M3 is a reduction in the clear aperture. Therefore the positions and angles M1 and M3 should be near symmetric to minimize this effect.

Coupling losses observed in Phase I experiments are likely due to residual misalignment of the system. The best alignment achieved yielded approximately 0.5 mm of precession at 2 meters and thus approximately 0.25 milliradians misalignment. This could be further improved using a longer lever arm and additional alignment iterations.

Variations

The reader should understand that the present invention is not limited by the above described embodiments and that the scope of the invention should be determined by the appended claims and their legal equivalence.

What is claimed is:

1. A fiber optic rotary connector comprising:
   A) a first fiber optical bundle comprised of a plurality of optical fibers;
   B) a second fiber optical bundle of comprised of a plurality of optical fibers, said second bundle rotating at a second bundle rotation rate relative to said first bundle;
   C) a fiber optic rotary connector adapted to provide optical communication between a plurality of optical fibers in said first fiber optic bundle with a corresponding plurality of fibers in said second fiber optic bundle, said fiber optic rotary connector comprising:

1) a K-mirror comprised of at least three mirror components and
2) a set of gears adapted to rotate said K-mirror at a rotation rate equal to one half of the second bundle rotation rate;

said K-mirror and said set of gears being adapted to maintain said plurality of optical fibers in optical communication with each other.

2. The rotary connector as in claim 1 wherein the set of gears is a set of magnetic gears.

3. The rotary connector as in claim 1 wherein the set of gears is a set of mechanical gears.

4. The rotary connector as in claim 1 wherein the first fiber optic bundle is stationary.

5. The rotary connector as in claim 1 wherein the first fiber optic bundle is also rotating but rotating more slowly than the second fiber optic bundle.

6. The rotary connector as in claim 1 wherein the K mirror is comprised of three flat mirrors and two of the flat mirrors are positioned at about 30 degrees relative to the third flat mirror.

\* \* \* \* \*